US006792614B1

(12) United States Patent
Matsumura et al.

(10) Patent No.: US 6,792,614 B1
(45) Date of Patent: Sep. 14, 2004

(54) OPTICAL DISK APPARATUS AND METHOD OF INSTALLING ITS SPINDLE MOTOR

(75) Inventors: Asayuki Matsumura, Katano (JP); Yoshihiko Yamada, Kobe (JP); Yasuhide Saito, Fukushima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 883 days.

(21) Appl. No.: 09/665,505

(22) Filed: Sep. 19, 2000

(30) Foreign Application Priority Data

Sep. 29, 1999 (JP) .......................................... 11-277212

(51) Int. Cl.⁷ .............................................. G11B 17/03
(52) U.S. Cl. ..................................................... 720/700
(58) Field of Search ........................ 720/700; 369/263, 369/254.5, 112.23, 112.12, 112.02, 44.32, 44.15, 30.74, 13.17, 13.12

(56) References Cited

U.S. PATENT DOCUMENTS

| 4,661,940 A | | 4/1987 | Camerik |
| 5,146,441 A | * | 9/1992 | Akiba et al. ............. 369/44.15 |
| 5,796,707 A | | 8/1998 | Kim |
| 5,867,471 A | | 2/1999 | Kim et al. |
| 6,005,836 A | | 12/1999 | Choi |
| 6,014,362 A | | 1/2000 | Park |
| 2001/0006507 A1 | | 7/2001 | Ogusu |

FOREIGN PATENT DOCUMENTS

| EP | 0 196 691 A1 | 10/1986 |
| EP | 0 341 936 A2 | 11/1989 |
| JP | 57199904 A | 12/1982 |
| JP | 10-69650 A | 3/1998 |
| JP | 10-112122 A | 4/1998 |
| JP | 10-177763 A | 6/1998 |
| JP | 10308023 A | 11/1998 |
| JP | 11-16265 A | 6/1999 |
| JP | 11-162095 A | 6/1999 |

OTHER PUBLICATIONS

Shin–ichi Yamada, "Track Center Servo and Radial Tilt Servo System for a Digital Versatile Rewritable Disc (DVD–RAM)", Japanese Journal of Applied Physics, vol. 39, pp. 867–870, Part 1, No. 2B (Feb. 2000).

* cited by examiner

*Primary Examiner*—Allen Cao
(74) *Attorney, Agent, or Firm*—Akin Gump Strauss Hauer & Feld, LLP

(57) ABSTRACT

In an optical disk apparatus and a method of installing its spindle motor in accordance with the present invention, calculation is carried out to obtain a height wherein the spindle motor is supported by spindle motor support portions on the basis of the tilt and height data of the disk mounting face of a turntable with respect to a reference plane and on the basis of the tilt and height data of a plane formed by the plural spindle motor support portions on a chassis with respect to the reference plane. The heights of the spindle motor support portions are corrected on the basis of the result of the calculation.

12 Claims, 11 Drawing Sheets

OPTICAL DISK APPARATUS AND METHOD OF INSTALLING ITS SPINDLE MOTOR

BACKGROUND OF THE INVENTION

The present invention relates to an optical disk apparatus capable of recording and reproducing information and to a method of installing spindle motor in the optical disk apparatus.

In recent years, optical disk apparatuses which read and reproduce information on an optical disk used as a recording medium by using an optical pickup have become smaller in size and higher in performance. Portable MD players using minidiscs have become generally widespread as portable optical disk apparatuses.

A portable MD player disclosed in the Japanese Unexamined Patent Publication No. Hei 11-96747 will be described below as an example of a conventional optical disk apparatus.

FIGS. 11A and 11B are sectional views showing the conventional portable MD player disclosed in the Japanese Unexamined Patent Publication No. Hei 11-96747. Referring to FIGS. 11A and 11B, the portable MD player has an outer case 101 comprising an openable upper lid 101a and a lower case 101b which rotatably holds the upper lid 101a. FIG. 11A shows a condition wherein the upper lid 101a is open, and FIG. 11B shows a condition wherein the upper lid 101a is closed and makes contact with the lower case 101b.

As shown in FIG. 11A, a minidisc case 102 (hereafter referred to as an MD case) accommodating an optical disk 100 is loaded while the upper lid 101a is opened. A variety of information such as music information has been recorded on the optical disk 100. A spindle motor 103 is disposed at the nearly central area of the lower case 101b. A turntable 104, on which the optical disk 100 inside the MD case 102 is to be put and rotated, is provided at the upper portion of the spindle motor 103.

In addition, an optical pickup 105 for reading information from the optical disk 100 accommodated in the MD case 102 and a feeding mechanism 106 for moving the optical pickup 105 in the diametric direction of the optical disk 100 are provided inside the lower case 101b. Numeral 107 designates a feeding shaft used as a component of the feeding mechanism 106. This feeding shaft 107 is rotatably supported by the chassis (not shown) of the feeding mechanism 106. The optical pickup 105 screw-engaged with the feeding shaft 107 is moved in the diametric direction of the optical disk 100 by the rotation the feeding shaft 107.

Furthermore, electric components and electric circuits required for playing the optical disk 100 inside the MD case 102 are disposed at the lower portion of the feeding mechanism 106 inside the lower case 101b.

In the conventional portable MD player configured as described below, the relative distance between the optical pickup 105 and the optical disk 100 is required to be set within an allowable range in order to securely read the information of the optical disk 100. In other words, the recording face of the optical disk 100 is required to be set to have a tilt within a predetermined range (not more than a standard value) with respect to the movement axis of the optical pickup 105. If the above-mentioned relative distance is not constant, and the focal length of the lens of the optical pickup 105 is not aligned with the recording face, the information of the optical disk 100 cannot be read properly.

Moreover, if the recording face of the optical disk 100 is not parallel but significantly tilted with respect to the movement axis of the optical pickup 105, the laser light emitted from the lens of the optical pickup 105 is reflected by the optical disk 100 and not fed back to the lens. Therefore, the information of the optical disk 100 cannot be read accurately.

The conventional optical disk apparatus having the above-mentioned configuration causes the following problems. If the optical disk 100 mounted on the turntable 104 of the spindle motor 103 is not parallel but tilted with respect to the movement axis of the optical pickup 105, and if the tilt is not within the allowable range, the information recorded on the optical disk 100 cannot be read accurately. For this reason, it is necessary to accurately assemble the turntable 104 on which the optical disk 100 is mounted and the feeding mechanism 106 of the optical pickup 105 at the time of assembling the conventional optical disk apparatus.

FIG. 12 is a partially sectional view showing the relationship between the optical disk 100 on the turntable 104 and the optical pickup 105 of the conventional optical disk apparatus. In the example shown in FIG. 12, a bracket 103a to which the spindle motor 103 is secured is tilted with respect to a chassis 108. As a result, the turntable 104 is assembled greatly tilted with respect to the movement axis of the optical pickup 105.

It is provided that the disk mounting face 104a of the spindle motor 103 installed on the chassis 108 is tilted at angle a for example with respect to the movement axis of the optical pickup 105 in the movement direction thereof as shown in FIG. 12. In this case, the relative distance A between the lens 105a of the optical pickup 105 and the recording face of the rotating optical disk 100 changes greatly, thereby greatly exceeding a predetermined allowable range (standard value) and causing a problem. The angle $\alpha$ is an angle between the rotation center axis of the spindle motor 103 and an axis perpendicular to the movement axis of the optical pickup 105. As a result, the focal length of the laser light from the optical pickup 105 is not aligned with the recording face of the optical disk. It thus becomes impossible to read the information of the optical disk 100.

In addition, variations in the tilt of the rotation axis of the spindle motor 103 and variations in the height of the rotation axis thereof with respect to the recording face of the optical disk 100 are relatively large when the spindle motor 103 is smaller. Therefore, in order to decrease the variations in the tilt and height of the spindle motor 103, it is necessary to raise the machining accuracy of the components of the spindle motor 103 or it is necessary to measure the dimensions of completed components and to select and use the components having dimensions within predetermined ranges. For example, when a specific figure is given for the tilt of the spindle motor 103, the tilt has a very narrow allowable range of about ±0.1 degree (in all directions) in the case of the MD player. Therefore, the spindle motor 103 of the conventional portable MD player has low productivity, resulting in high cost.

SUMMARY OF THE INVENTION

To solve the above-mentioned problems, the present invention is intended to provide an optical disk apparatus wherein the tilt of a loaded optical disk is set within a predetermined range. This is attained by adjusting the relative distance between the lens of an optical pickup and the recording face of the optical disk even if the disk mounting face of a turntable is tilted with respect to the movement axis of the optical pickup and the height of the disk mounting face varies considerably because the installation position of a spindle motor is tilted with respect to a chassis. The present invention is further intended to provide a method of installing the spindle motor for use in the optical disk apparatus.

An optical disk apparatus in accordance with the present invention comprises:

reading means for reading information from a disk on which information is recorded, movement means for moving the reading means in parallel with the recording face of the disk, a spindle motor having a turntable on which the disk is mounted and rotated and having a bracket secured thereto, a chassis having plural spindle motor support portions to support the bracket, on which the movement means is fixed and the reading means is movably held, and height correction means which calculates a height, whereat the spindle motor is supported by the spindle motor support portions on the basis of the tilt and height data of the disk mounting face of the turntable with respect to a reference plane and on the basis of the tilt and height data of a plane formed by the plural spindle motor support portions on the chassis with respect to the reference plane and for correcting the heights of the spindle motor support portions on the basis of the result of the calculation.

In the optical disk apparatus in accordance with the present invention configured as described above, the positional relationship in tilt and height between the reading means and the disk mounted on the turntable can be corrected accurately even if the disk mounting face of the turntable of the spindle motor has variations in tilt and height.

Furthermore, in the optical disk apparatus in accordance with the present invention, the height correction means carries out correction by installing spacers having desired thicknesses on the spindle motor support portions when the heights of the spindle motor support portions obtained as the result of the calculation have minus values. On the other hand, when the heights of the spindle motor support portions obtained as the result of the calculation have plus values, the height correction means carries out correction by grinding the spindle motor support portions so that they have desired heights.

Furthermore, in the optical disk apparatus in accordance with the present invention, data regarding the tilt and height of the disk mounting face with respect to the bracket of the spindle motor is written on a part of the spindle motor. Therefore, in the optical disk apparatus in accordance with the present invention, it is possible to quickly make a decision as to whether spacers having proper thicknesses are selected on the basis of the result of the calculation or the support portions are ground so that they have proper heights on the basis of the result of the calculation by simply reading data from the spindle motor. Therefore, productivity can be improved greatly.

A method of installing the spindle motor of the optical disk apparatus in accordance with the present invention, in an assembling process for the optical disk apparatus having reading means for reading information from a disk on which information is recorded, movement means for moving the reading means in parallel with the recording face of the disk, a spindle motor having a turntable on which the disk is mounted and rotated and having a bracket secured thereto, and a chassis having plural spindle motor support portions to support the bracket, on which the movement means is fixed and the reading means is movably held, comprises:

a step of measuring and calculating the tilt and height of the disk mounting face of the turntable with respect to a reference plane, and a step of carrying out calculation for height correction in accordance with the results of measurement and calculation on the basis of data regarding the turntable and correcting the heights of the spindle motor support portions on the basis of the result of the calculation.

In the optical disk apparatus assembled as described above, the positional relationship in tilt and height between the reading means and the disk mounted on the turntable can be corrected accurately even if the disk mounting face of the turntable of the spindle motor has variations in tilt and height. Therefore, it is possible to obtain a highly reliable optical disk apparatus.

A method of installing the spindle motor of the optical disk apparatus in accordance with the present invention from another point of view, in an assembling process for the optical disk apparatus having reading means for reading information from a disk on which information is recorded, movement means for moving the reading means in parallel with the recording face of the disk, a spindle motor having a turntable on which the disk is mounted and rotated and having a bracket secured thereto, and a chassis having plural spindle motor support portions to support the bracket, on which the movement means is fixed and the reading means is movably held, comprises:

a step of measuring and calculating the tilt and height of the disk mounting face of the turntable with respect to a reference plane, a step of measuring and calculating the tilt and height of a plane formed by the plural spindle motor support portions on the chassis with respect to the reference plane, and a step of carrying out calculation for height correction in accordance with the results of measurement and calculation on the basis of data regarding the turntable and the chassis and correcting the heights of the spindle motor support portions in accordance with the result of the calculation.

In the optical disk apparatus assembled as described above, the positional relationship in tilt and height between the reading means and the disk mounted on the turntable can be corrected accurately even if the plane formed by the spindle motor support portions has variations in tilt and height with respect to the reference plane. This is attained since the height data of the spindle motor support portions on the chassis is used in addition to the tilt of the disk mounting face of the turntable. Therefore, it is possible to obtain a highly reliable optical disk apparatus.

A method of installing the spindle motor of the optical disk apparatus in accordance with the present invention from another point of view, in an assembling process for the optical disk apparatus having reading means for reading information from a disk on which information is recorded, movement means for moving the reading means in parallel with the recording face of the disk, a spindle motor having a turntable on which the disk is mounted and rotated and having a bracket secured thereto, and plural spindle motor support portions to support the bracket, on which the movement means is fixed and the reading means is movably held, and plural movement means support portions for supporting the movement means, comprises:

a step of measuring and calculating the tilt and height of the disk mounting face of the turntable with respect to a reference plane, a step of measuring and calculating the tilt and height of a plane formed by the plural spindle motor support portions on the chassis with respect to a reference plane, a step of measuring and calculating the tilt and height of a plane formed by the plural movement means support portions on the chassis with respect to the reference plane, and a step of carrying out calculation for height correction in accordance with the results of measurement and calculation on the basis of data regarding the turntable and the chassis and correcting the heights of the spindle motor support portions in accordance with the result of the calculation.

In the optical disk apparatus assembled as described above, the positional relationship in tilt and height between the reading means and the disk mounted on the turntable can be corrected accurately even if the plane formed by the movement means support portions has variations in tilt and height. This is attained since the height data of the movement means support portions on the chassis is used in addition to the tilt data of the disk mounting face of the turntable and the height data of the spindle motor support portions on the chassis.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of an optical disk apparatus in accordance with the present invention will be described below in detail referring to the accompanying drawings.

Embodiment 1

Figure 1:
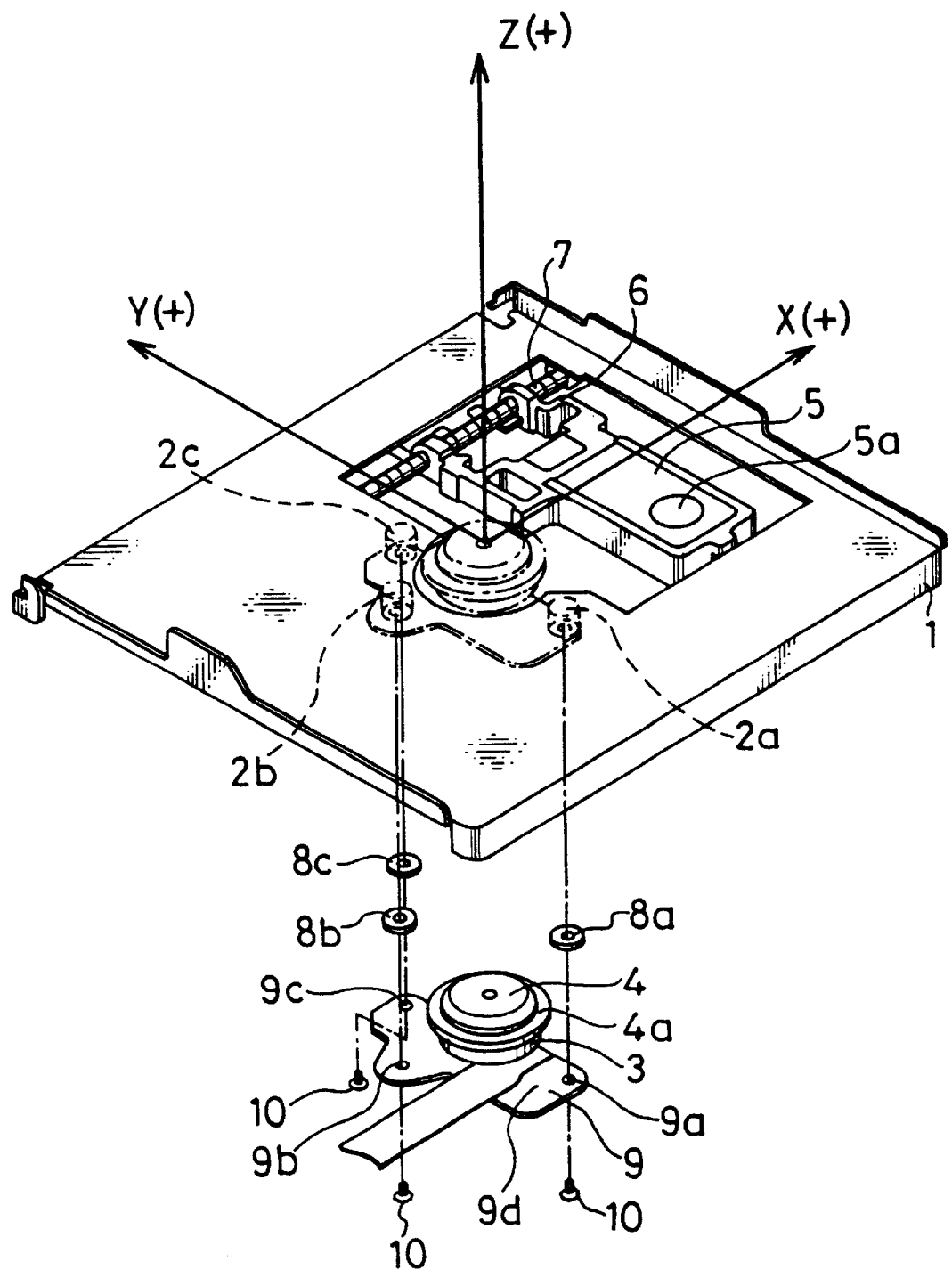
FIG. 1 is an exploded perspective view showing the spindle motor assembly of an optical disk apparatus in accordance with embodiment 1 of the present invention.
Figure 2:
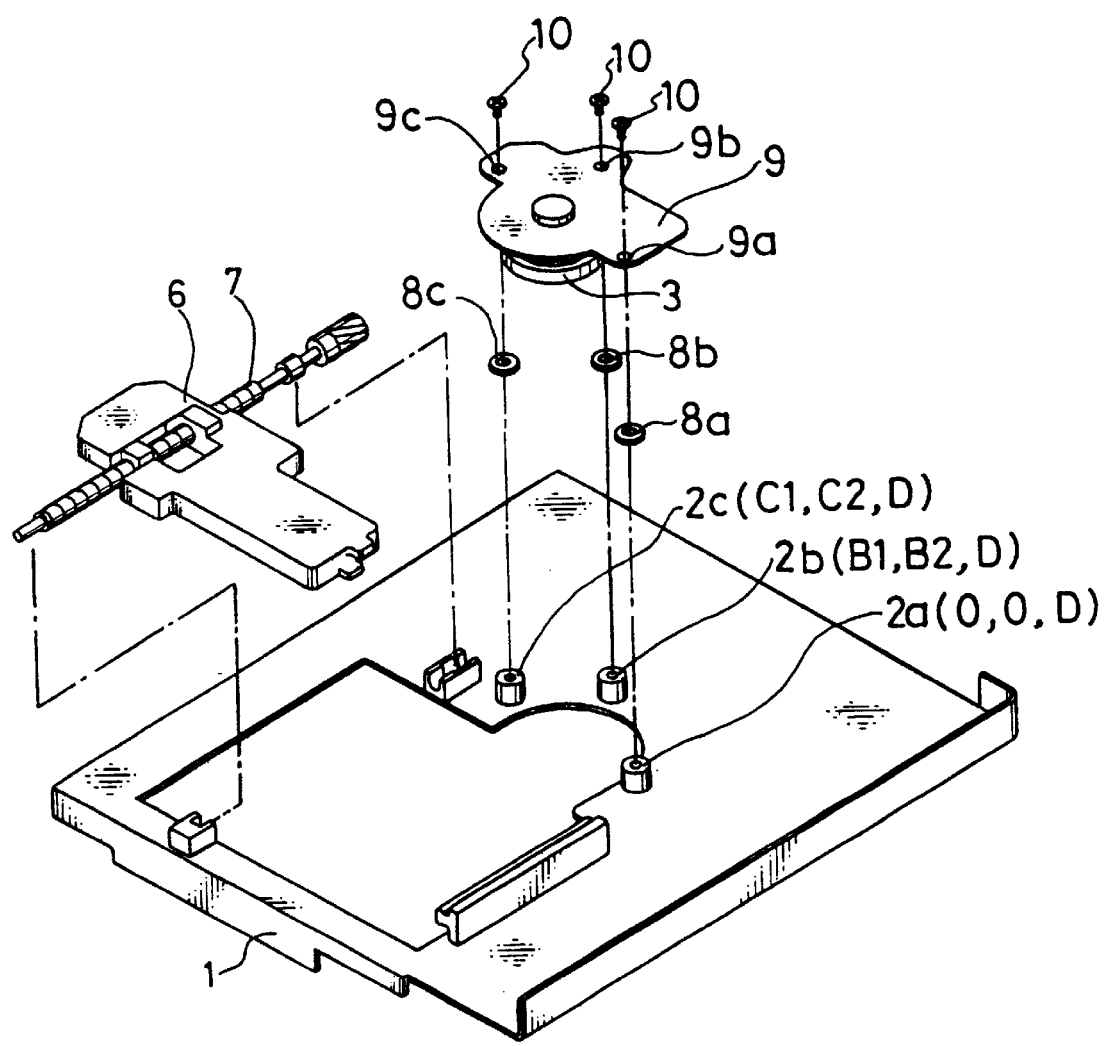
FIG. 2 is an exploded perspective view, seen from bottom, showing the spindle motor assembly shown in FIG. 1.
Figure 3:
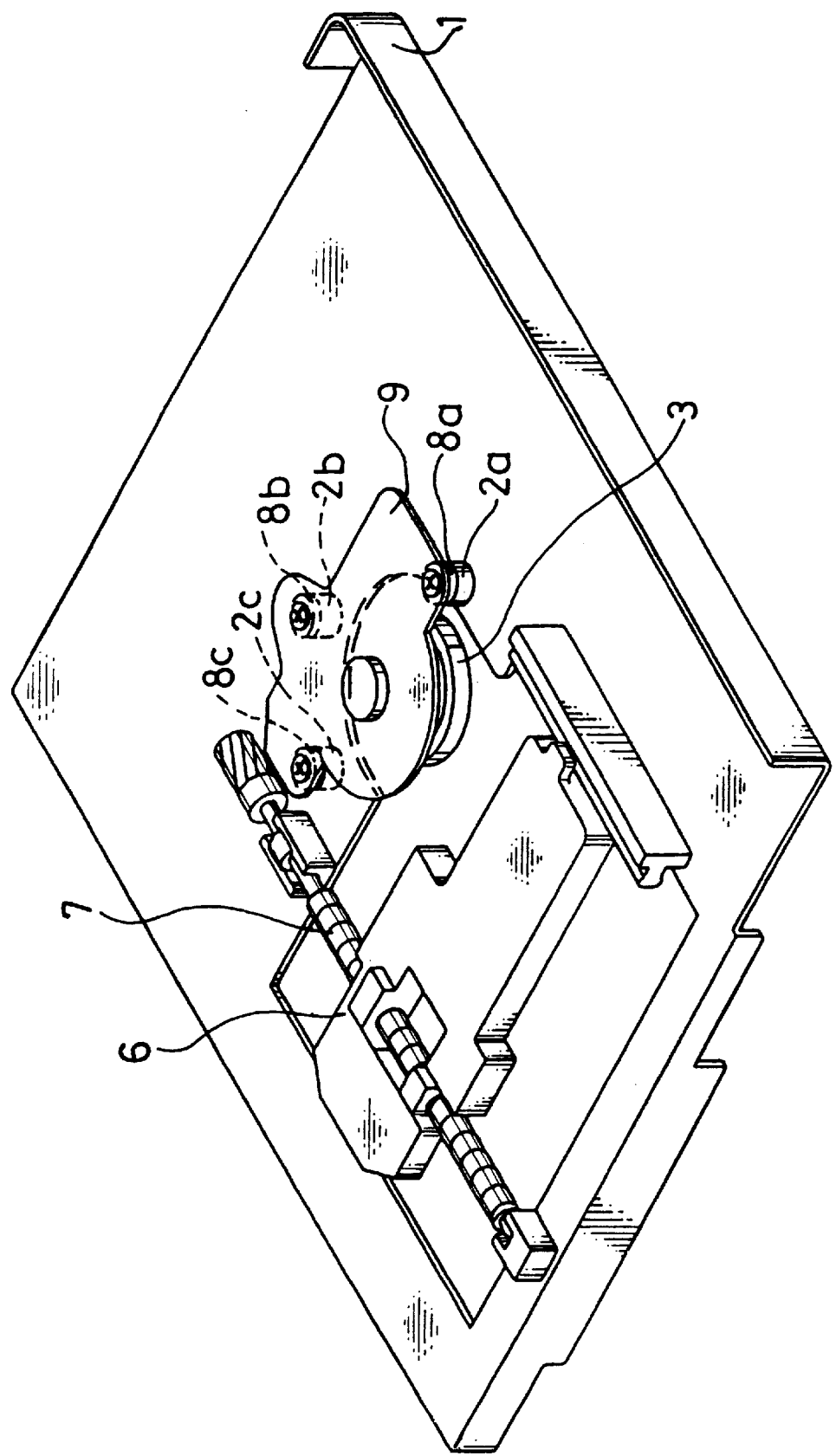
FIG. 3 is an assembly drawing showing the spindle motor assembly shown in FIG. 2.

Embodiment 1 of the optical disk apparatus in accordance with the present invention will be described below referring to the drawings. FIG. 1 is an exploded perspective view, seen from above, showing the major components of the embodiment 1 of the optical disk apparatus in accordance with the present invention. FIG. 2 is an exploded perspective view seen from below showing the chassis, spindle motor, optical pickup, feeding mechanism and so on of the embodiment 1 shown in FIG. 1. FIG. 3 is a perspective view showing a condition wherein the components shown in FIG. 2 are assembled.

Figure 11A:
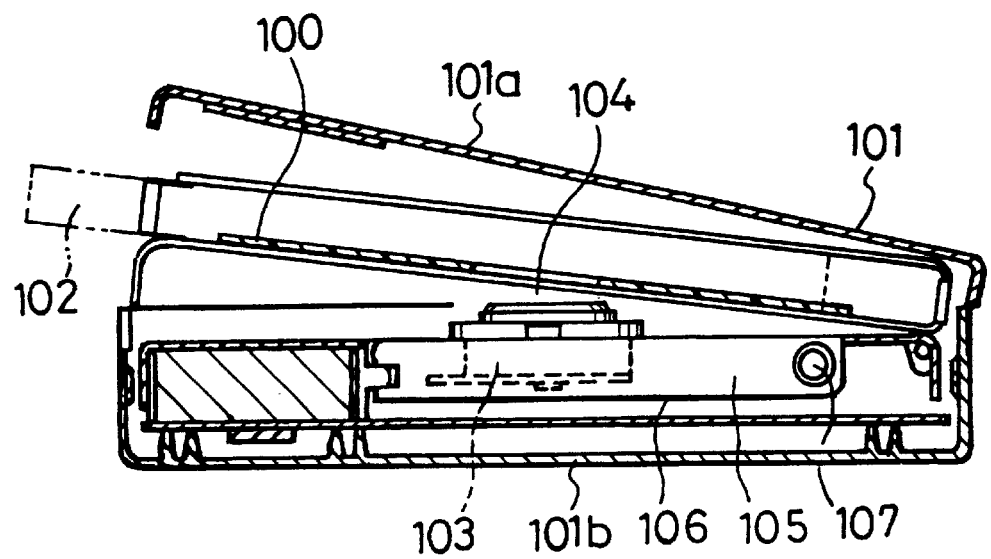
FIGS. 11A and 11B are sectional views showing the spindle motor assembly of the conventional optical disk apparatus.
Figure 11B:
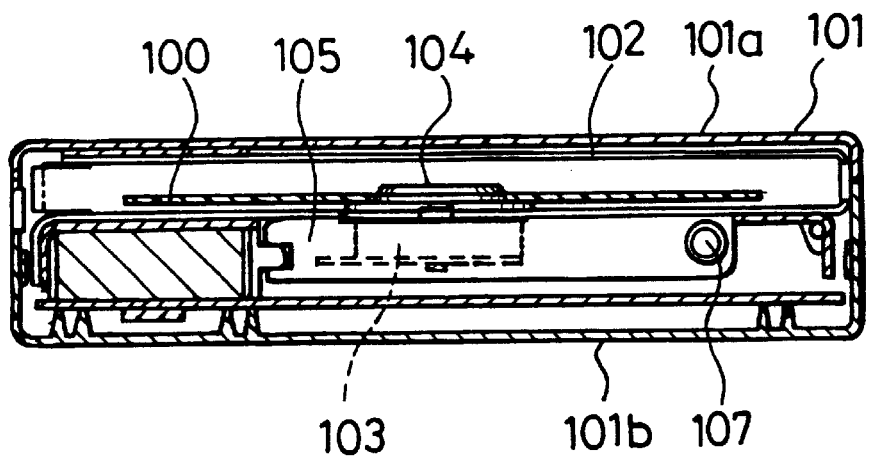
Figure 12:
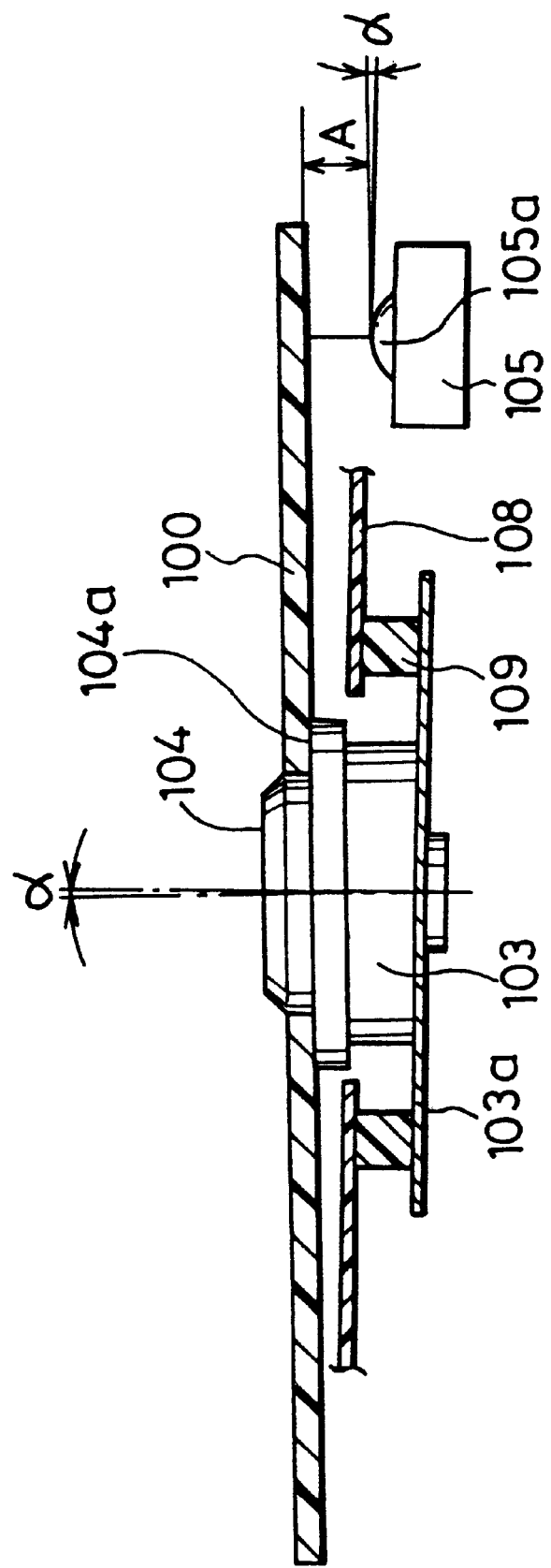
FIG. 12 is the partially sectional view showing the spindle motor of the conventional optical disk apparatus.

The optical disk apparatus in accordance with the embodiment 1 is a portable minidisc player (hereafter simply referred to as an MD player). FIGS. 1 to 3 show the major components of the MD player such as a chassis 1, a spindle motor 3, an optical pickup 5 and a feeding mechanism 6. Just like the MD player shown in the aforementioned FIGS. 11A and 11B, the MD player in accordance with the embodiment 1 has an outer case comprising an openable upper lid and a lower case which rotatably holds the upper lid. The components of the MD player shown in FIGS. 1 to 3 are disposed inside the above-mentioned outer case.

As shown in FIG. 1, the spindle motor 3 is disposed at the nearly central area of the chassis 1. A turntable 4, on which an optical disk inside a minidisc case (MD case) is mounted and rotated, is provided at the upper portion of the spindle motor 3. A variety of information such as music information has been recorded on the optical disk so that the information can be read by the optical pickup 5.

The optical pickup 5 for reading the information of the optical disk inside the MD case has a lens 5a and is moved by a feeding mechanism 6 in the diametric direction of the optical disk. The feeding mechanism 6 has a feeding shaft 7, and the optical pickup 5 is screw-engaged with the feeding shaft 7. The feeding shaft 7 is rotatably supported by the chassis 1. By rotating the feeding shaft 7, the optical pickup 5 screw-engaged with the feeding shaft 7 is moved in the diametric direction of the optical disk.

As shown in FIGS. 1 to 3, three spindle motor support portions 2a, 2b and 2c are integrally-molded on the chassis 1 formed of a synthetic resin at the installation position of the spindle motor 3. The heights of these spindle motor support portions 2a, 2b and 2c from the bottom face of the chassis 1 have been set slightly smaller than a predetermined height (standard value). The bracket 9 of the spindle motor 3 is installed at the spindle motor support portions 2a, 2b and 2c via spacers 8a, 8b and 8c having desired thicknesses.

As described above, in the optical disk apparatus in accordance with the embodiment 1, the spindle motor 3 is installed at the spindle motor support portions 2a, 2b and 2c formed on the chassis 1 with the spacers 8a, 8b and 8c having desired thicknesses.

These spacers 8a, 8b and 8c are inserted between the bracket 9 and the spindle motor support portions 2a, 2b and 2c, and secured by tightening setscrews 10 from the bottom of the bracket 9 at the spindle motor support portions 2a, 2b and 2c. The spindle motor 3 is securely supported and fixed to the chassis 1 by tightenning the setscrews 10 at the spindle motor support portions 2a, 2b and 2c as described above.

Even if the tilt of the turntable 4 with respect to the bracket 9 is large in the spindle motor 3 used for the optical disk apparatus in accordance with the embodiment 1, the disk mounting face 4a of the turntable 4 is adjusted so as to be parallel with the movement axis of the optical pickup 5 by using the spacers 8a, 8b and 8c having desired thicknesses respectively.

A method of calculating the thicknesses of the spacers 8a, 8b and 8c, and a method of selecting the spacers 8a, 8b and 8c used for the optical disk apparatus in accordance with the embodiment 1 will be described below in detail.

The spindle motor 3 assembled in an optical disk apparatus assembly line undergoes measurements in a measurement process wherein the positions of various measurement points from a reference plane are measured. For example, the tilt and height of the turntable 4 with respect to the installation face of the bracket 9 of the spindle motor 3 are measured in the measurement process. Such measurement data is transmitted on line to the next assembly line, that is, an installation process wherein the spindle motor 3 is installed on the chassis 1.

The measurement data to be transmitted to the installation process will be described below.

In FIG. 1, it is provided that the direction indicated by arrow X designates the plus (+) direction of the X axis, that the direction indicated by arrow Y designates the plus (+) direction of the Y axis, and that the direction indicated by arrow Z designates the plus (+) direction of the Z axis. In the X-Y-Z coordinates wherein the X, Y and Z axes are set in this way, for example, the measured tilt of the disk mounting face 4a of the turntable 4 is represented by measurement data. The measurement data comprises information on an angle (Xa) formed by the plus (+) direction of the X axis and the line segment intersecting the perpendicular line from the X axis to the disk mounting face 4a and information on an angle (Ya) formed by the plus (+) direction of the Y axis and the line segment intersecting the perpendicular line from the Y axis to the disk mounting face 4a. In addition, the difference (+H) between the height from the bracket face 9d of the bracket 9 making contact with the spindle motor 3 to the disk mounting face 4a and a predetermined standard value (Ho) in the direction of the shaft (the Z axis) of the spindle motor 3 is used as measurement data.

Furthermore, in the chassis 1 having the spindle motor support portions 2a, 2b and 2c, the tip positions of the spindle motor support portions 2a, 2b and 2c on the chassis 1 are indicated on the X-Y-Z coordinates using the X, Y and Z axes as described above. For example, it is assumed that the tip positions of the spindle motor support portions 2a, 2b and 2c are (0, 0, D), (B1, B2, D) and (C1, C2, D) respectively. In other words, the position of the spindle motor support portion 2a is at the center (0, 0) of the X-Y coordinates, and the height thereof is D. The height D indicates that the height is different from a predetermined standard value by −D mm. The standard values (Ho) are defined as follows. Proper sizes in the spindle motor assembly of an optical disk apparatus used as a reference are defined as standard values. In other words, the standard values (Ho) are the dimensions of an optical disk apparatus in which the disk mounting face 4a of the turntable 4 is not tilted with respect to the bracket face 9d of the bracket 9 and the height of the disk mounting face 4a of the turntable 4 is set at a proper level so that the information of the optical disk 100 can be securely read by the optical pickup 5 when the bracket 9 is installed on the chassis 1. For the relationships among the above-mentioned standard values (Ho), difference (H) and height (D), refer to FIG. 5 described later.

In the optical disk apparatus in accordance with the embodiment 1, all the heights of the tip positions of the spindle motor support portions 2a, 2b and 2c are set equally at −D mm with respect to the standard value (Ho). Therefore, the thicknesses of the spacers 8a, 8b and 8c are calculated in consideration of only the tilt and height of the disk mounting face 4a of the turntable 4. The spacers 8a, 8b and 8c having thicknesses based on the result of the calculation are installed at the spindle motor support portions 2a, 2b and 2c. In the embodiment 1, the heights of the spindle motor support portions 2a, 2b and 2c are set smaller than the standard value (Ho) so that the tilt and height of the disk mounting face 4a can be adjusted by inserting the spacers 8a, 8b and 8c having desired thicknesses between the bracket 9 and the spindle motor support portions 2a, 2b and 2c.

A method of calculating the thicknesses of the spacers 8a, 8b and 8c to be inserted between the bracket 9 and the spindle motor support portions 2a, 2b and 2c will be described below. It is herein provided that the thicknesses of the spacers 8a, 8b and 8c are S1, S2 and S3 respectively. Furthermore, it is provided that the positions of the spindle motor support portions 2a, 2b and 2c on the X-Y-Z coordinates are (0, 0, D), (B1, B2, D) and (C1, C2, D) respectively as described above.

When the spacers 8a, 8b and 8c are installed between the bracket face 9a of the spindle motor 3 and the spindle motor support portions 2a, 2b and 2c, the tilt of the turntable 4 is derived from the following expressions. It is provided herein that the tilt in the X direction is K1 and that the tilt in the Y direction is K2.

$$K1 = \tan^{-1}(1/Z) \quad (1)$$

$$K2 = \tan^{-1}(Z/W) \quad (2)$$

Z and W in the above expressions (1) and (2) are coefficients indicating the tilts of the disk mounting face 4a with respect to a specific predetermined reference plane of the chassis 1 in the case when the spindle motor 3 is installed on the chassis 1 via the spacers 8a, 8b and 8c. It is assumed that the tilt with respect to the X axis is 1, that the tilt with respect to the Y axis is W, and that the tilt with respect to the Z axis is Z.

The equation representing the disk mounting face 4a tilted in this way is represented by the following expression (3) in the case of the embodiment 1.

$$(x-B1) + W(y-B2) + Z(z-D-S2) = 0 \quad (3)$$

In the above-mentioned expression (3), x, y and z are variables for the axes on the X-Y-Z coordinates.

In the embodiment 1, when the bracket 9 is installed on the spindle motor support portions 2a, 2b and 2c of the chassis 1 via the spacers 8a, 8b and 8c, the coordinates of the center positions of the installation holes 9a, 9b and 9c in the bracket face 9a are (0, 0, D+S1), (B1, B2, D+S2) and (C1, C2, D+S3) respectively. W and Z are obtained by assigning the coordinates of the center positions of the installation holes 9a, 9b and 9c to the variables (x, y, z) of the above-mentioned expression (3). As a result, the following expressions (4) and (5) are obtained.

$$Z=(B1 \times (C2-B2)-B2 \times (C1-B1))/(B2 \times ((D+S3)-(D+S2))+((D+S1)-(D+S2)) \times (C2-B2)) \quad (4)$$

$$W=(Z \times ((D+S1)-(D+S2))-B1)/B2 \quad (5)$$

K1 and K2 of the expressions (1) and (2) are calculated by using the obtained Z and W. The tilt K1 (the expression (1)) in the X direction and the tilt K2 (the expression (2)) in the Y direction at the disk mounting face 4a of the turntable 4 after the installation, obtained by the above-mentioned expressions, are calculated in this way. Values as small as possible are selected from the tilt values. The spacers 8a, 8b and 8c are formed of plural kinds of sheet-like substances having predetermined thicknesses. Therefore, the thicknesses of the spacers 8a, 8b and 8c are selected from the thicknesses of the substances having predetermined thicknesses.

At the disk mounting face 4a of the turntable 4 of the single unit of the above-mentioned spindle motor 3, the difference between the tilt Xa in the X direction and the tilt K1 and the difference between the tilt Ya in the Y direction and the tilt K2, that is, $\Delta x=Xa-K1$ and $\Delta y=Ya-K2$, indicate correction amounts for the tilt of the turntable 4 of the assembled spindle motor 3. In other words, $\Delta x$ and $\Delta y$ indicate the tilt correction amounts for the disk mounting face 4a of the turntable 4 after the spacers 8a, 8b and 8c having desired thicknesses are inserted in the chassis 1. The tilt K1 of the disk mounting face 4a of the assembled turntable 4 in the X direction and the tilt K2 thereof in the Y direction being close to zero are selected in this way. The proper tilt of the disk mounting face 4a of the spindle motor assembly is determined by the above-mentioned selection.

The thicknesses of the spacers 8a, 8b and 8c are selected so that the height (H) of the disk mounting face 4a corrected to have the proper tilt as described above becomes the standard value (Ho).

The height (H) of the disk mounting face 4a, that is, the position thereof in the Z direction, is selected by using the average thickness of the spacers 8a, 8b and 8c and the tilt of the disk mounting face 4a of the assembled spindle motor 3 with respect to the reference plane of the chassis 1.

When it is assumed that the height of the disk mounting face 4a of the turntable 4 is represented by the difference from the standard value (Ho) and that the height is Ht, the height Ht is derived from the next expression (6).

$$Ht=((S1+S2+S3)/3-D+\Delta H)+H \quad (6)$$

In the expression (6), $\Delta H$ is the height corrected in accordance with the tilt of the disk mounting face 4a.

Next, the assembly of the spindle motor of the optical disk apparatus in accordance with the embodiment 1 will be described below by using its concrete examples.

For example, a case having the following data regarding the spindle motor 3 and the chassis 1 will be described below. The spindle motor 3 has tilts Xa=0.05 degrees and Ya=0.2 degrees, and has height H=0.04 mm. Furthermore, the coordinates of the tip positions of the spindle motor support portions 2a, 2b and 2c on the chassis 1 are (0, 0, D), (B1, B2, D) and (C1, C2, D). The numeral values of these are B1=2.5 mm, B2=21.0 mm, D=−0.11 mm, C1=10.1 mm and C2=13.3 mm.

When the above-mentioned spindle motor 3 is installed on the chassis 1, calculation is carried out in the case of inserting spacers S1, S2 and S3 having various thicknesses, i.e., 0.0 mm, 0.05 mm, 0.75 mm, 0.1 mm, 0.125 mm and 0.15 mm.

TABLES 1 and 2 described below show the results of the calculation. TABLES 1 and 2 also show the tilts and heights of the disk mounting face 4a obtained by substituting the above-mentioned numeral values into the aforementioned expressions (1) to (5).

TABLE 1

| Spacer | | | Tilt | | Height |
|---|---|---|---|---|---|
| 8a Thickness [mm] | 8b Thickness [mm] | 8c Thickness [mm] | X [degree] | Y [degree] | H + D [mm] |
| 0 | 0 | 0.0 | 0.050 | 0.200 | 0.070 |
| 0 | 0 | 0.05 | 0.010 | 0.536 | 0.063 |
| 0 | 0 | 0.075 | −0.010 | 0.705 | 0.059 |
| 0 | 0 | 0.1 | −0.030 | 0.873 | 0.055 |
| 0 | 0 | 0.125 | −0.050 | 1.041 | 0.052 |
| 0 | 0 | 0.15 | −0.070 | 1.209 | 0.048 |
| 0.05 | 0 | 0 | −0.072 | 0.077 | 0.048 |
| 0.05 | 0 | 0.05 | −0.112 | 0.413 | 0.040 |
| 0.05 | 0 | 0.075 | −0.132 | 0.581 | 0.037 |
| 0.05 | 0 | 0.1 | −0.152 | 0.749 | 0.033 |
| . | . | . | . | . | . |
| . | . | . | . | . | . |
| 0.075 | 0.075 | 0.1 | 0.030 | 0.368 | −0.009 |
| 0.075 | 0.075 | 0.125 | 0.010 | 0.536 | −0.012 |
| 0.075 | 0.075 | 0.15 | −0.010 | 0.705 | −0.016 |
| 0.1 | 0.075 | 0.0 | 0.049 | −0.366 | −0.005 |
| 0.1 | 0.075 | 0.05 | 0.009 | −0.030 | −0.012 |
| 0.1 | 0.075 | 0.075 | −0.011 | 0.138 | −0.016 |
| 0.1 | 0.075 | 0.1 | −0.031 | 0.307 | −0.020 |
| 0.1 | 0.075 | 0.125 | −0.051 | 0.475 | −0.023 |
| 0.1 | 0.075 | 0.15 | −0.071 | 0.643 | −0.027 |
| . | . | . | . | . | . |
| . | . | . | . | . | . |

TABLE 2

| Spacer | | | Tilt | | Height |
|---|---|---|---|---|---|
| 8a Thickness [mm] | 8b Thickness [mm] | 8c Thickness [mm] | X [degree] | Y [degree] | H + D [mm] |
| 0.1 | 0.1 | 0.15 | 0.010 | 0.536 | −0.037 |
| 0.125 | 0.1 | 0 | 0.069 | −0.534 | −0.026 |
| 0.125 | 0.1 | 0.05 | 0.029 | −0.198 | −0.034 |
| 0.125 | 0.1 | 0.075 | 0.009 | −0.030 | −0.037 |
| 0.125 | 0.1 | 0.1 | −0.011 | 0.138 | −0.041 |
| 0.125 | 0.1 | 0.125 | −0.031 | 0.307 | −0.045 |
| 0.125 | 0.1 | 0.15 | −0.051 | 0.475 | −0.048 |
| 0.15 | 0.1 | 0 | 0.008 | −0.596 | −0.038 |
| . | . | . | . | . | . |
| . | . | . | . | . | . |
| 0.15 | 0.125 | 0 | 0.089 | −0.703 | −0.048 |
| 0.15 | 0.125 | 0.05 | 0.049 | −0.366 | −0.055 |
| 0.15 | 0.125 | 0.075 | 0.029 | −0.198 | −0.059 |
| 0.15 | 0.125 | 0.1 | 0.009 | −0.030 | −0.062 |
| 0.15 | 0.125 | 0.125 | −0.011 | 0.138 | −0.066 |
| 0.15 | 0.125 | 0.15 | −0.031 | 0.307 | −0.070 |

TABLE 2-continued

| Spacer | | | Tilt | | Height |
|---|---|---|---|---|---|
| 8a Thickness [mm] | 8b Thickness [mm] | 8c Thickness [mm] | X [degree] | Y [degree] | H + D [mm] |
| 0 | 0.15 | 0 | 0.535 | −0.439 | 0.009 |
| 0 | 0.15 | 0.05 | 0.495 | −0.103 | 0.002 |
| 0 | 0.15 | 0.075 | 0.475 | 0.065 | −0.002 |
| 0 | 0.15 | 0.1 | 0.455 | 0.234 | −0.006 |
| . | . | . | . | . | . |
| . | . | . | . | . | . |
| . | . | . | . | . | . |

In TABLE 1, for example, when the thickness of the spacer 8a is 0 (0 in TABLE 1 indicates that no spacer is inserted), when the thickness of the spacer 8b is 0, and when the thickness of the spacer 8c is 0, the difference in the tilt in the X direction with respect to the proper disk mounting face is 0.05 degrees, the difference in the tilt in the Y direction is 0.2 degrees, and the height is 0.07 mm. The reason why the height is 0.07 mm is as follows. Since the height H of the disk mounting face 4a of the spindle motor 3 is 0.04 mm (H=0.04 mm) and the heights D of the spindle motor support portions 2a, 2b and 2c are equally set at −0.11 mm (D=−0.11 mm), the sum of these is obtained as 0.07 mm.

Figure 4:
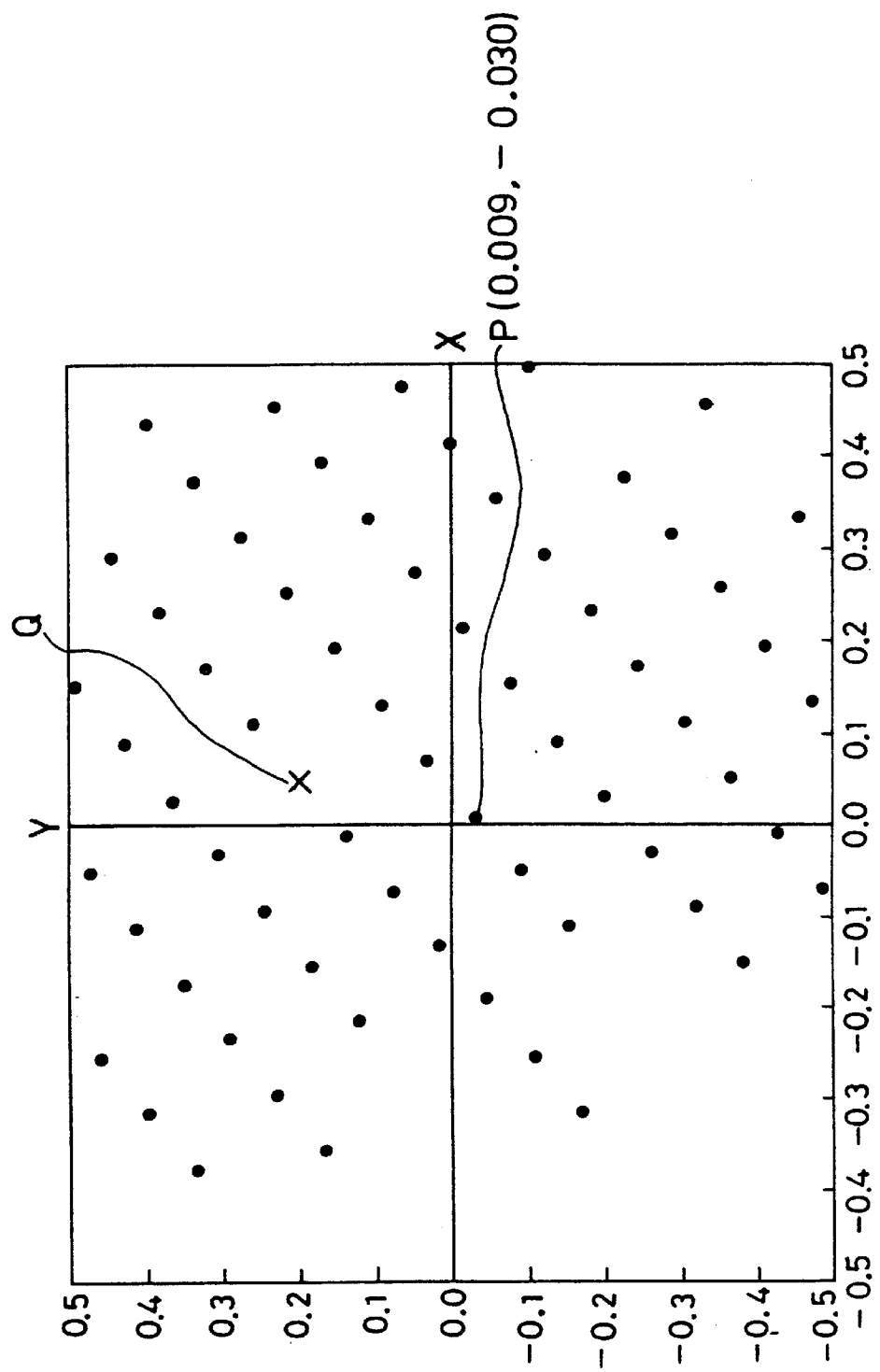
FIG. 4 is a graph showing a method of selecting spacers in accordance with the embodiment 1 of the present invention.

FIG. 4 is a graph showing the tilts in the X and Y directions in TABLES 1 and 2, and is a distribution graph obtained when correction is carried out by inserting the spacers 8a, 8b and 8c.

A method of combining and selecting the spacers 8a, 8b and 8c having proper thicknesses so that the tilt of the disk mounting face 4a becomes smallest and so that the height thereof becomes nearly equal to the standard value (Ho) will be describe below by using TABLES 1 and 2 and FIG. 4.

In the distribution graph of FIG. 4, the combination wherein the tilts in the X and Y directions are nearly "0, 0" is obtained at point P. The X and Y values at the point are X=0.009 and Y=−0.030. As the combination of the spacers 8a, 8b and 8c capable of being used for correction to obtain this tilt, three combinations are available in the TABLES 1 and 2. They are (0.1, 0.075, 0.05), (0.125, 0.1, 0.075) and (0.15, 0.125 and 0.1). Among these, it is understood that the height (H+D) becomes closest to "0" in the case of the combination of (0.1, 0.075, 0.05) and the value of the height is −0.012 mm in this case.

Furthermore, point Q indicated by mark "x" in FIG. 4 represents the tilts of the disk mounting face 4a of the single unit of the spindle motor 3. As shown in FIG. 4, by selecting the proper combination of the spacers (0.1, 0.075, 0.05) as described above, it is understood that the tilts at point Q can be corrected to the tilts at point P.

The overall tilt of the disk mounting face 4a after the assembly of the spindle motor 3 and the chassis 1 can be obtained by the following expression.

The overall tilt (M1) of the disk mounting face 4a of the single unit of the spindle motor 3 can be obtained by the following expression (7).

$$M1=\sqrt{[(0.2)^2+(0.05)^2]}=0.206 \quad (7)$$

The overall tilt (M2) after the assembly and correction of the spindle motor 3 on the chassis 1 by using the spacers 8a, 8b and 8c can be obtained by the following expression (8).

$$M2=\sqrt{[(0.009)^2+(-0.030)^2]}0.031 \quad (8)$$

As described above, the overall tilt (M2) after the assembly and correction in the embodiment 1 is 0.031. Since the range of the standard value (Ho) used as the target value of the tilt is 0.1 or less, the tilt value is within the range of the target value.

Furthermore, the standard value (target value) of the height in the embodiment 1 is within ±0.05 mm after assembly. Since the height of this assembly is −0.012 mm as described above, this value is sufficiently within the range of the standard value.

By using the selection method in accordance with the embodiment 1as described above, the spindle motor 3 is installed, supported and secured to the chassis 1 while the proper spacers 8a, 8b and 8c are held between the bracket 9 of the spindle motor 3 and the spindle motor support portions 2a, 2b and 2c. With this method, it is possible to correct the tilt and height of the disk mounting face 4a of the spindle motor assembly.

Figure 5:
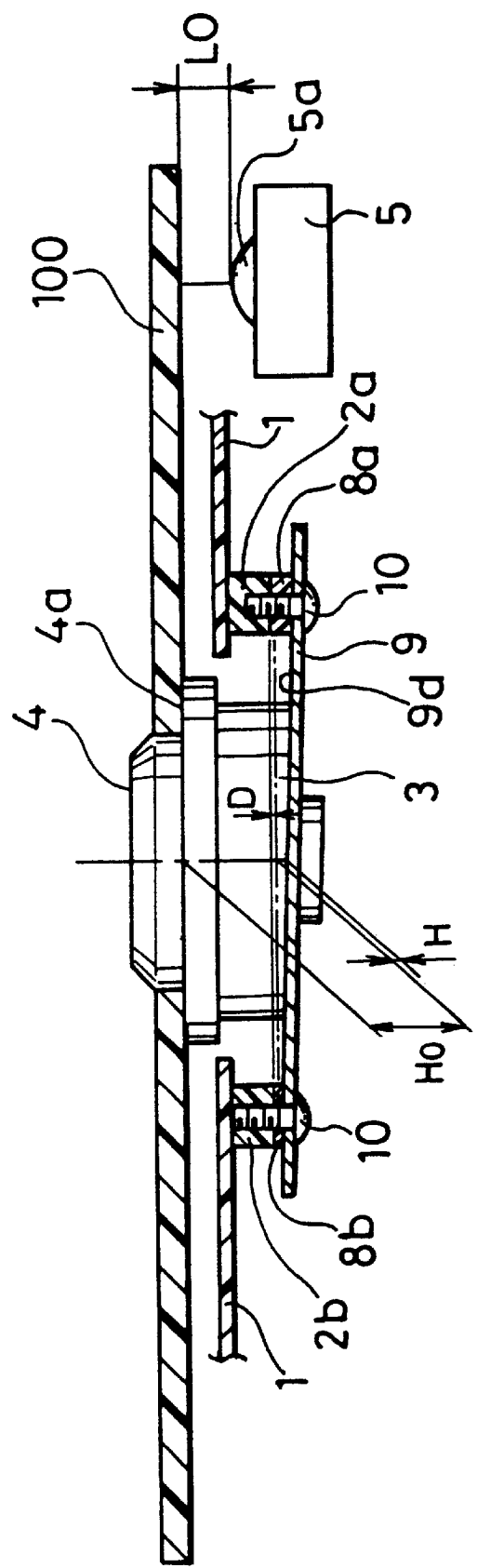
FIG. 5 is a sectional view showing the spindle motor assembly in accordance with the embodiment 1 of the present invention.

As shown in FIG. 5, a sectional view showing the spindle motor assembly, the spacers 8a, 8b and 8c having the proper thicknesses accurately correct the tilt and height of the disk mounting face 4a by inserting the selected spacers 8a, 8b and 8c (the spacer 8c is not shown in FIG. 5). As a result, the recording face of the optical disk 100 becomes parallel with the movement axis of the optical pickup 5. In addition, the relative distance (L0) between the lens 5a of the optical pickup 5 and the recording face of the optical disk is set at a nearly constant proper value at all times.

The operation of the optical disk apparatus in accordance with the embodiment 1 configured as described above will be described below.

The relative distance (L0) between the lens 5a of the optical pickup 5 and the recording face of the optical disk 100 and the tilt of the optical disk 100 in the embodiment 1 have been set within the predetermined ranges as described above. As a result, the lens 5a of the optical pickup 5 in the assembled optical disk apparatus can move in parallel with the recording face of the optical disk 100 and can read desired information recorded on the optical disk 100. If the relative distance (L0) between the lens 5a of the optical pickup 5 and the recording face of the optical disk 100 is not constant, and if the focal length of the lens 5a of the optical pickup 5 is not aligned with the position of the recording face of the optical disk 100, the optical pickup 5 cannot properly read the information of the optical disk 100. Furthermore, if the recording face of the optical disk 100 is tilted with respect to the movement axis of the optical pickup 5, the laser light emitted from the lens 5a of the optical pickup 5 is reflected by the optical disk 100 and is not fed back to the lens 5a. This kind of optical disk apparatus cannot accurately read the information of the optical disk 100.

In the embodiment 1, the relative distance (L0) between the lens 5a of the optical pickup 5 and the recording face of the optical disk 100 and the tilt of the recording face can be set securely within the predetermined ranges as described above. Therefore, in the optical disk apparatus in accordance with the embodiment 1, the information of the optical disk 100 rotating on the turntable 4 of the spindle motor 3 can be read securely by the lens 5a of the optical pickup 5.

In the optical disk apparatus in accordance with the embodiment 1, the heights of the spindle motor support portions 2a, 2b and 2c on the chassis 1 are set slightly lower than the standard value (Ho) so that the heights can be corrected by inserting the spacers 8a, 8b and 8c. However, the present invention is not limited to this configuration. For example, contrary to the above-mentioned setting, the heights of the spindle motor support portions 2a, 2b and 2c may be set slightly larger than the standard value (Ho) so that the thicknesses S1, S2 and S3 of the spacers 8a, 8b and 8c obtained as the result of the calculation are set at minus values. Then, the heights of the spindle motor support portions 2a, 2b and 2c on the chassis 1 may be ground (or cut) so that the tilt and height of the disk mounting face 4a of the turntable 4 are within the predetermined ranges (less than the standard values). In other words, the heights of the spindle motor support portions 2a, 2b and 2c are ground (or cut) by the amounts (minus values) of the spacer thicknesses obtained as the result of the calculation so that the heights are shortened to the predetermined values. By grinding (or cutting) the spindle motor support portions 2a, 2b and 2c to correct the tilt and height of the disk mounting face 4a as described above, it is also possible to obtain an effect similar to that of the above-mentioned embodiment 1.

Furthermore, in the optical disk apparatus in accordance with the present invention, the heights of the spindle motor support portions 2a, 2b and 2c on the chassis 1 are set close to the predetermined height (standard value). In the case when the thickness of a spacer has a plus value as the result of the above-mentioned calculation, the spacer having the thickness is installed at the corresponding spindle motor support portion. On the other hand, in the case when the thickness of a spacer has a minus value as the result of the calculation, the corresponding spindle motor support portion is ground (or cut) so as to have a desired height. In this way, the spacers are selected, the spindle motor support portions are cut, or nothing is carried out on the basis of the result of the calculation at the time of the assembly of the optical disk apparatus. As a result, it is possible to obtain an effect similar to that of the above-mentioned embodiment 1.

Embodiment 2

Figure 6:
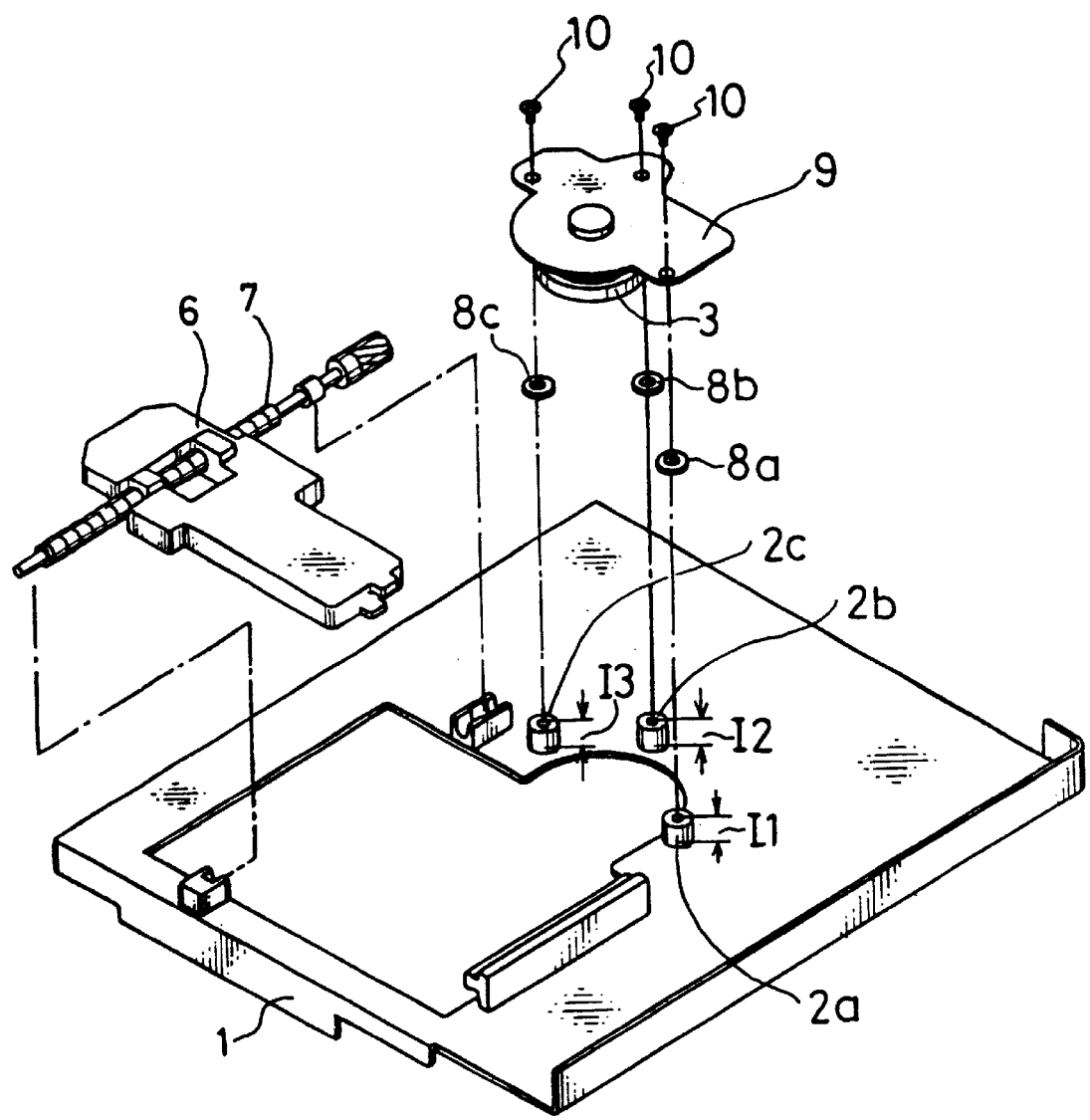
FIG. 6 is an exploded perspective view showing the spindle motor assembly of an optical disk apparatus in accordance with embodiment 2 of the present invention.

An optical disk apparatus in accordance with embodiment 2 of the present invention will be described below referring to the accompanying drawings. FIG. 6 is a perspective rear view showing the major components, such as the chassis and spindle motor, of the optical disk apparatus in accordance with the embodiment 2.

The configuration of the optical disk apparatus in accordance with the embodiment 2 is the same as that of the optical disk apparatus in accordance with the aforementioned embodiment 1. However, the calculation method for the tilt and height corrections at the time when a spindle motor 3 is installed on a chassis 1 differs from that of the embodiment 1. Therefore, the same components in structures and functions as those of the optical disk apparatus in accordance with the aforementioned embodiment 1 are designated by the same numerals in the embodiment 2, and their explanations are omitted.

In the optical disk apparatus in accordance with the embodiment 2, the heights of spindle motor support portions 2a, 2b and 2c on the chassis 1 are set slightly lower than the predetermined height (standard value). As shown in FIG. 6, spacers 8a, 8b and 8c are inserted and installed between the bracket 9 of the spindle motor 3 and the spindle motor support portions 2a, 2b and 2c.

The method of installing the spindle motor of the optical disk apparatus in accordance with the embodiment 2 differs from the method in the above-mentioned embodiment 1 in the following point. Data I1, I2 and I3 regarding the heights of the spindle motor support portions 2a, 2b and 2c of the chassis 1 are measured, and the measurement data are used to carry out calculation for the correction of the disk mounting face 4a.

In the embodiment 2, the data regarding the tilt and height of the turntable 4 with respect to the bracket 9 of the single unit of the spindle motor and the data I1, I2 and I3 regarding the heights of the spindle motor support portions 2a, 2b and 2c are used for calculation. Proper thicknesses of the spacers 8a, 8b and 8c are selected depending on the result of the calculation.

A concrete calculation expression for calculating the proper thicknesses of the spacers 8a, 8b and 8c in the embodiment 2 will be described below by taking up an example.

The following explanation applies to a case wherein the disk mounting face 4a of the turntable 4 is tilted as described below just as in the case of the embodiment 1 shown in FIG. 1. That is, for example, the disk mounting face 4a is tilted by angle Xa between the line segment intersecting the perpendicular line from the X axis and the plus (+) direction of the X axis and is also tilted by angle Ya between the line segment intersecting the perpendicular line from the Y axis and the plus (+) direction of the Y axis. Regarding the height from the bracket face 9d of the bracket 9 of the spindle motor 3 to the disk mounting face 4a of the turntable 4, the height in the axial direction of the spindle motor 3 differs by +H from the desired standard value (Ho).

Furthermore, just as in the case of the embodiment 1, in the chassis 1 having the spindle motor support portions 2a, 2b and 2c, it is assumed that the X-Y-Z coordinates of the positions of the spindle motor support portions 2a, 2b and 2c are (0, 0, D1), (B1, B2, D2) and (C1, C2, D3). In other words, the position of the spindle motor support portion 2a is at the center (0, 0) of the X-Y coordinates, and the height thereof is D1. In addition, the heights D1, D2 and D3 are differences from a predetermined height (a standard value= J) and can be obtained from the following expressions (9) to (11). D1, D2 and D3 are all minus values.

$$D1 = I1 - J \tag{9}$$

$$D2 = I2 - J \tag{10}$$

$$D3 = I3 - J \tag{11}$$

Just as in the case of the aforementioned embodiment 1, when the spacers 8a, 8b and 8c having the thicknesses S1, S2 and S3 respectively are installed on the spindle motor support portions 2a, 2b and 2c of the chassis 1, the tilt of the disk mounting face 4a is derived from the following expressions (12) and (13). It is herein assumed that the tilt in the X direction is K1 and that the tilt in the Y direction is K2.

$$K1 = \tan^{-1}(1/Z1) \tag{12}$$

$$K2 = \tan^{-1}(W1/Z1) \tag{13}$$

Z1 and W1 in the above expressions (12) and (13) are coefficients indicating the tilts of the disk mounting face 4a with respect to a specific predetermined reference plane of the chassis 1 in the case when the spindle motor 3 is installed on the chassis 1 via the spacers 8a, 8b and 8c. It is herein assumed that the tilt with respect to the X axis is 1, that the tilt with respect to the Y axis is W1, and that the tilt with respect to the Z axis is Z1.

Z1 and W1 are obtained from the following expressions (14) and (15).

$$Z = (B1 \times (C2 - B2) - B2 \times (C1 - B1))/(B2 \times ((D3 + S3) - (D2 + S2)) + ((D1 + S1) - (D2 + S2)) \times (C2 - B2)) \tag{14}$$

$$W1 = (Z1 \times ((D1 + S1) - (D2 + S2)) - B1)/B2 \tag{15}$$

K1 and K2 are calculated from the expressions (12) and (13) by using the obtained Z1 and W1. Just as in the case of the aforementioned embodiment 1, the tilt K1 in the X direction and the tilt K2 in the Y direction at the disk mounting face 4a of the turntable 4 after the assembly, are calculated, and values close to zero are selected from the tilt values. The disk mounting face 4a obtained by the aforementioned selection and assembly becomes the disk mounting face 4a of the spindle motor 3 having a proper tilt.

The thicknesses of the spacers 8a, 8b and 8c are selected so that the height (H) of the disk mounting face 4a corrected to have the proper tilt as described above becomes the standard value (Ho). The height (H) of the disk mounting face 4a is selected by using the average thickness of the spacers 8a, 8b and 8c and the tilt of the disk mounting face 4a of the assembled spindle motor 3 with respect to the reference plane of the chassis 1.

In the embodiment 2, the heights of the spindle motor support portions 2a, 2b and 2c of the chassis 1 are measured and the measurement data is used for the calculation expressions. Therefore, the spindle motor installation method of the embodiment 2 can carry out correction more accurately than the method of the above-mentioned embodiment 1, even if the heights of the spindle motor support portions 2a, 2b and 2c have variations.

As described above, in the optical disk apparatus of the embodiment 2, a value nearly equal to the actual tilt of the spindle motor 3 with respect to the chassis 1 is used for the calculation. Therefore, the spindle motor assembly of the optical disk apparatus in accordance with the embodiment 2 is assembled while the disk mounting face 4a is corrected highly accurately.

In the optical disk apparatus in accordance with the embodiment 2, the heights of the spindle motor support portions 2a, 2b and 2c on the chassis 1 are set slightly lower than the standard value (Ho) so that the heights can be corrected by inserting the spacers 8a, 8b and 8c. However, the present invention is not limited to this configuration. For example, contrary to the above-mentioned setting, the heights of the spindle motor support portions 2a, 2b and 2c may be set slightly larger than the standard value (Ho) so that the thicknesses S1, S2 and S3 of the spacers 8a, 8b and 8c obtained as the result of the calculation are set at minus values. The heights of the spindle motor support portions 2a, 2b and 2c on the chassis 1 may be ground (or cut) on the basis of the result of the calculation so that the tilt and height of the disk mounting face 4a of the turntable 4 are corrected so as to be within the predetermined ranges (less than the standard values).

Furthermore, in the optical disk apparatus in accordance with the present invention, the heights of the spindle motor support portions 2a, 2b and 2c on the chassis 1 are set close to the predetermined height (standard value). In the case when the thickness of a spacer has a plus value as the result of the above-mentioned calculation, the spacer having the thickness is installed at the corresponding spindle motor support portion. On the other hand, in the case when the thickness of a spacer has a minus value as the result of the calculation, the corresponding spindle motor support portion is ground (or cut) so as to have a desired height. In this way, the spacers are selected, the spindle motor support portions are cut, or nothing is carried out on the basis of the result of the calculation at the time of the assembly of the optical disk apparatus. Even if this method is used, the optical disk apparatus can offer an effect similar to that of the aforementioned embodiment 1.

Embodiment 3

Figure 7:
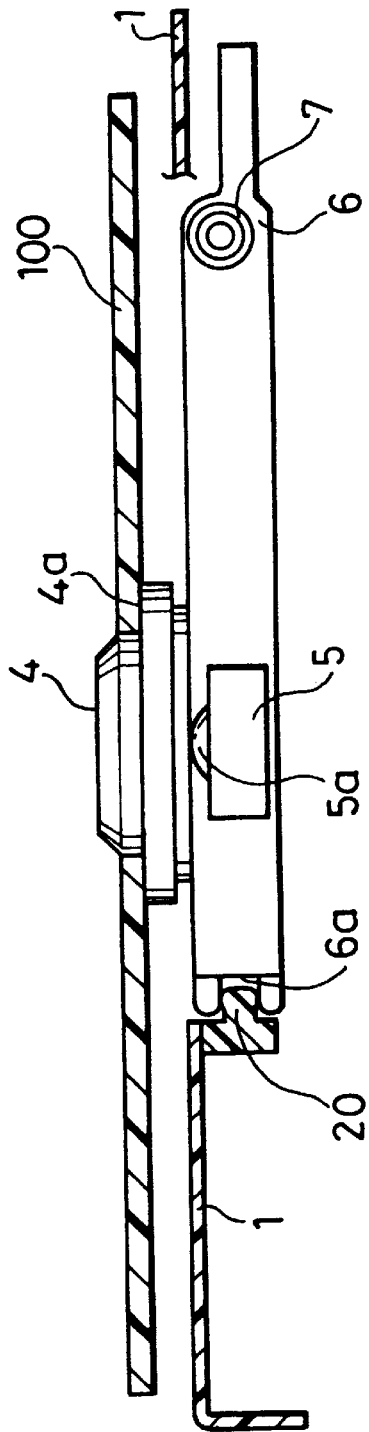
FIG. 7 is a vertical sectional view showing a spindle motor assembly in accordance with embodiment 3 of the present invention.
Figure 8:
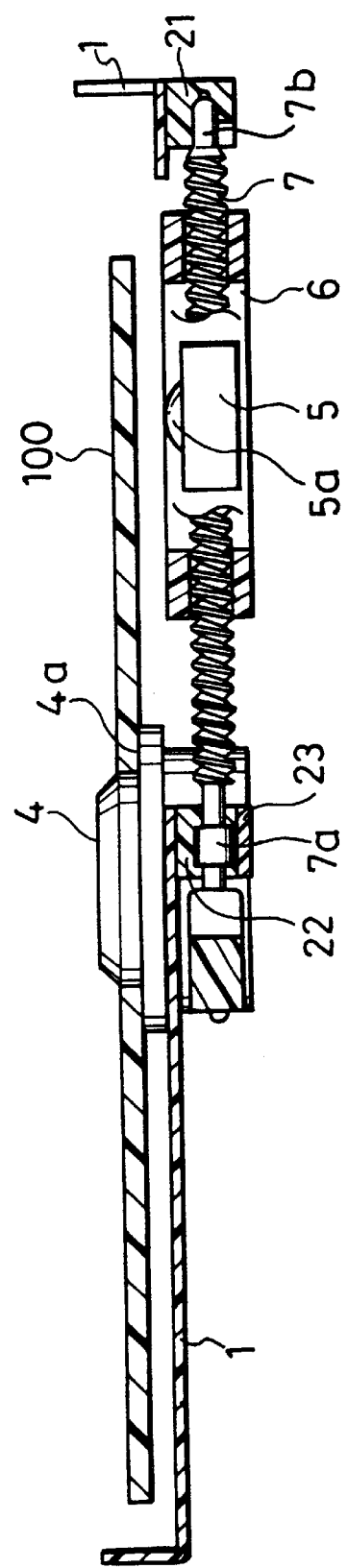
FIG. 8 is a transverse sectional view showing the spindle motor assembly in accordance with embodiment 3 of the present invention.
Figure 9:
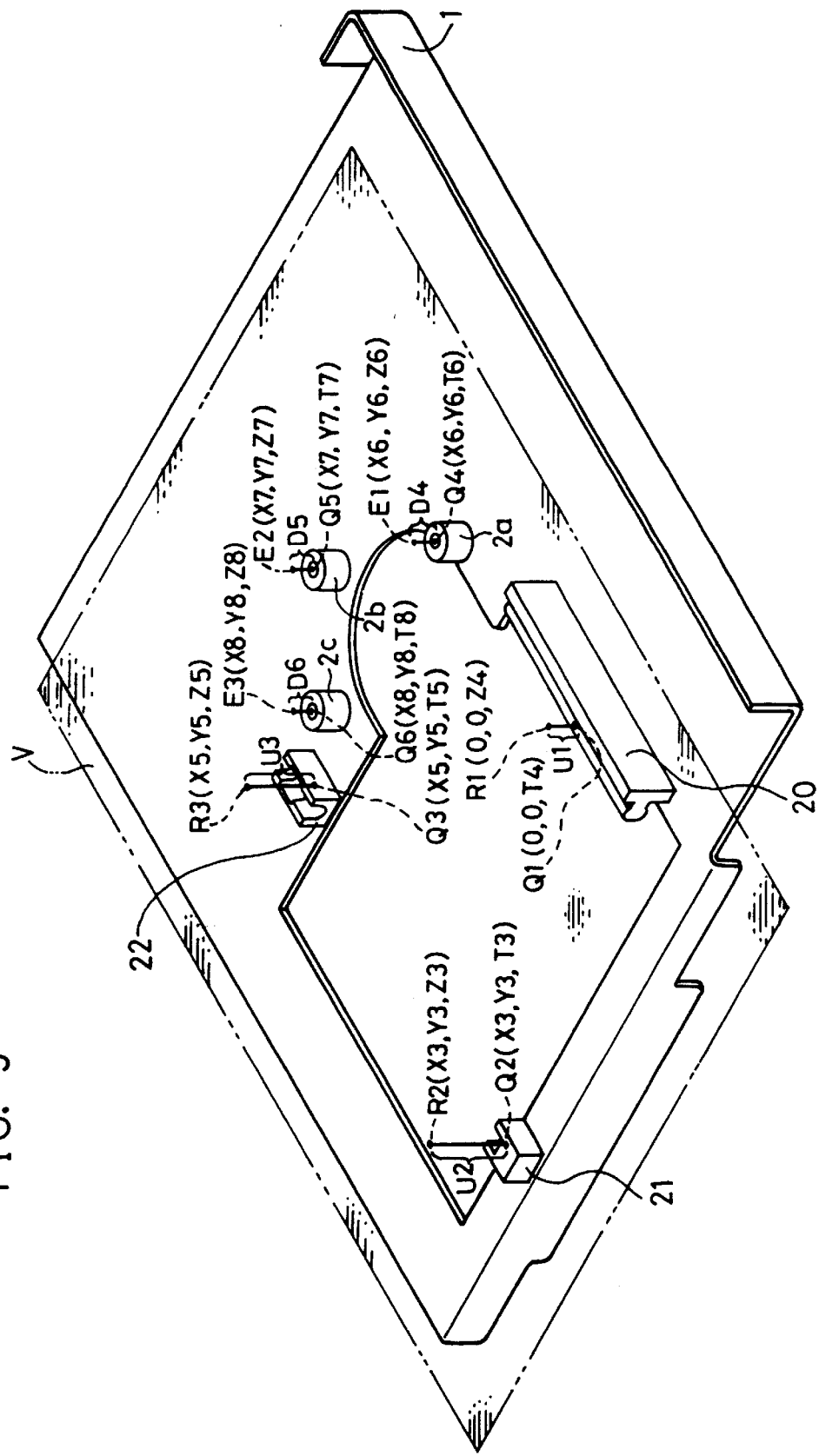
FIG. 9 is a view showing measurement positions on a chassis in accordance with the embodiment 3 of the present invention.

An optical disk apparatus in accordance with embodiment 3 of the present invention will be described below referring to the accompanying drawings. FIG. 7 is a vertical sectional view showing the spindle motor assembly of the optical disk apparatus in accordance with the embodiment 3. FIG. 8 is a transverse sectional view showing the spindle motor assembly. FIG. 9 is a view showing the positions of the spindle motor support portions on a chassis 1 in accordance with the embodiment 3.

The configuration of the optical disc apparatus in accordance with the embodiment 3 is similar to that of the aforementioned embodiment 1. Therefore, the same components in structures and functions as those of the optical disk apparatus in accordance with the embodiment 1 are designated by the same numerals, and their explanations are omitted.

FIG. 7 is a vertical sectional view showing the spindle motor assembly in accordance with the embodiment 3 having an optical pickup 5, a feeding mechanism 6, a turntable 4 on which an optical disk 100 is mounted, etc. The optical pickup 5 shown in FIG. 7 is moved by the feeding mechanism 6 in a direction perpendicular to the face of the paper on which the figure is drawn. FIG. 8 is a transverse sectional view showing the spindle motor assembly shown in FIG. 7. The optical pickup 5 shown in FIG. 8 is moved by the feeding mechanism 6 in a direction parallel to the face of the paper on which the figure is drawn.

As shown in FIG. 7, the optical pickup 5 is screw-engaged with a feeding shaft 7 at one end. A guide groove 6a is formed at the other end of the optical pickup 5, that is, at the position opposite to the portion screw-engaged with the feeding shaft 7, with the lens 5a of the optical pickup 5 disposed between the ends. This guide groove 6a is slidably engaged with a guide 20 formed on the chassis 1.

As shown in FIG. 8, a large-diameter portion 7a is formed near one end of the feeding shaft 7. In addition, a tip portion 7b is formed at the other end of the feeding shaft 7. The large-diameter portion 7a is rotatably supported by a support portion 22 formed on the chassis 1 and a cover 24 used as the case of the optical disk apparatus. The tip portion 7b of the feeding shaft 7 is also rotatably supported by a holding portion 21 formed on the chassis 1.

Since the spindle motor assembly of the optical disk apparatus in accordance with the embodiment 3 is configured as described above, the tilt of the optical pickup 5 with respect to the chassis 1 is determined by the heights of the support positions of the guide 20, the holding portion 21 and the support portion 22 on the chassis 1.

In the embodiment 3, the heights of the predetermined positions (support positions) of the guide 20, the holding portion 21 and the support portion 22 on the chassis 1 are measured, and the measurement data is used for assembly. Therefore, it is attained to provide an optical disk apparatus having a highly accurate spindle motor assembly.

A method of installing the spindle motor on the chassis 1 in accordance with the embodiment 3 will be described below referring to FIG. 9.

FIG. 9 is a perspective view showing measurement positions on the chassis 1 in accordance with the embodiment 3. The support positions (measurement positions) of the guide 20, the holding portion 21 and the support portion 22 on the chassis 1 shown in FIGS. 7 and 8 correspond to the positions designated by Q1 (the guide 20), Q2 (the holding portion 21) and Q3 (the support portion 22) in FIG. 9. These positions are represented by the X-Y-Z coordinates and assumed to be Q1 (0, 0, T4), Q2 (X3, Y3, T3) and Q3 (X5, Y5, T5) respectively. In other words, the support position of the guide 20 designated by Q1 is assumed to be the origin (0, 0) of the X-Y coordinates.

Furthermore, the tip positions of the spindle motor support portions 2a, 2b and 2c on the chassis 1 for supporting the spindle motor 3 are measured as shown in FIG. 9 and represented by coordinates. For example, the coordinates of the tip positions of the spindle motor support portions 2a, 2b and 2c are assumed to be Q4 (X6, Y6, T6), Q5 (X7, Y7, T7) and Q6 (X8, Y8, T8) respectively.

A reference plane V including the movement axis of the optical pickup 5 supported by the chassis 1 and being parallel with the disk mounting face is obtained at this time. The reference plane V is obtained from the coordinates (measurement positions) of the guide 20, the holding portion 21 and the support portion 22. The reference plane V is a plane on which the bracket 9 of the spindle motor 3 is installed when the disk mounting face 4a of the turntable 4 is not tilted with respect to the bracket 9 of the spindle motor 3 and when the height of the disk mounting face 4a is the standard value (Ho) at the center of the turntable. The plane has a height wherein the information of the optical disc 100 can be securely read by the optical pickup 5 supported by the chassis 1 when the spindle motor 3 is assembled by installing the bracket 9 on the reference plane V.

The reference plane V is obtained by using the following expressions.

The reference plane V is formed by three imaginary points R1 (0, 0, Z4), R2 (X3, Y3, Z3) and R3 (X5, Y5, Z5) obtained by adding correction heights U1, U2 and U3 to the coordinates (measurement values) of the positions of the guide 20 (Q1), the holding portion 21 (Q2) and the support portion 22 (Q3) on the chassis 1 respectively. Z4, Z3 and Z5 are herein represented as follows: Z4=T4 +U1, Z3=T3 +U2, and Z5=T5 +U3. In addition, the correction heights U1, U2 and U3 are values determined in view of design.

An equation for the reference plane V is obtained next. Generally, an equation for a plane is represented by the following expression (16).

$$x + Ly + Mz + N = 0 \quad (16)$$

In the expression (16), L, M and N are coefficients. These coefficients L, M and N are obtained by the following expressions (17), (18) and (19) by using the coordinates R1, R2 and R3 of the intersections of the perpendicular lines drawn from the guide 20 (Q1), the holding portion 21 (Q2) and the support portion 22 (Q3) to the reference plane V.

$$M = (X5 \times Y3 - X3 \times Y5)/((Y5 \times Z3 - Y3 \times Z5 + (Y5 - Y3) \times Z4) \quad (17)$$

$$N = M \times Z4 \quad (18)$$

$$L = (M \times Z3 + N + X3)/Y3 \quad (19)$$

By substituting the M, N and L values obtained by the expressions (17), (18) and (19) into the expression (16), it is possible to obtain the equation of the reference plane V.

Next, it is provided that the intersections of the perpendicular lines from the spindle motor support portions 2a, 2b and 2c of the chassis 1 to the standard plane V are E1, E2 and E3, and that their coordinates are E1 (X6, Y6, Z6), E2 (X7, Y7, Z7) and E3 (X8, Y8, Z8). In these coordinates, the heights represented by the Z-axis coordinate values Z6, Z7, Z8 of E1, E2 and E3 are obtained by the following expressions (20), (21) and (22).

$$Z6 = -(X6 + L \times Y6 + N)/M \quad (20)$$

$$Z7 = -(X7 + L \times Y7 + N)/M \quad (21)$$

$$Z8 = -(X8 + L \times Y8 + N)/M \quad (22)$$

The coordinates (measurement positions) of the tips of the spindle motor support portions 2a, 2b and 2c of the chassis 1 are Q4 (X6, Y6, T6), Q5 (X7, Y7, T7) and Q6 (X8, Y8, T8). Therefore, the differences D4, D5 and D6 between these heights and the reference plane V are represented as follows:

$$D4 = Z6 - T6 \quad (23)$$

$$D5 = Z7 - T7 \quad (24)$$

$$D6 = Z8 - T8 \quad (25)$$

The differences D4, D5 and D6 between the heights and the reference plane V are replaced with D1, D2 and D3 used in the above-mentioned embodiment 2. In other words, replacement is carried out as follows: D1=−D4, D2=−D5 and D3=−D6. These are then substituted into the expressions (12) to (15) used in the embodiment 2 to calculate the tilts. Spacers 8a, 8b and 8c having proper thicknesses and to be inserted between the bracket 9 of the spindle motor 3 and the spindle motor support portions 2a, 2b and 2c of the chassis 1 are selected in accordance with the result of the calculation. The method of selecting the spacers 8a, 8b and 8c is carried out just as in the case of the aforementioned embodiment 1 or 2.

The coordinate values Q4 (X6, Y6, T6), Q5 (X7, Y7, T7) and Q6 (X8, Y8, T8) of the tips of the spindle motor support portions 2a, 2b and 2c of the chassis 1 shown in FIG. 9 represent the center positions of the holes formed at their centers, i.e., imaginary points that cannot be measured. As a method of obtaining these coordinate values, a method described below can be used for example. The positions of several points on the circular faces at the tips of the spindle motor support portions 2a, 2b and 2c are measured and averaged, and the average values are used as the coordinate values of Q4, Q5 and Q6. This method of obtaining the coordinate values is just an example. The present invention is not limited to this method. It may be possible to use other known imaginary point determination methods.

Unlike the case of the aforementioned embodiment 2, in the optical disk apparatus in accordance with the embodiment 3, the height data of the guide 20, the holding portion 21 and the support portion 22 are additionally measured to determine the height of the optical pickup 5. The tilt of the disk mounting face 4a is corrected by using the data. Therefore, the values to be input to the calculation expressions can be made closer to the actual tilt values in the optical disk apparatus in accordance with the embodiment 3 than in the optical disk apparatus in accordance with the embodiment 2. As a result, it is possible to accurately correct the tilt of the disk mountinq face 4a in the optical disk apparatus in accordance with the embodiment 3.

Furthermore, in the embodiments 1 to 3, it is explained that the spacers 8a, 8b and 8c each have a thin cylindrical shape with parallel faces on both ends. However, in the case when the spacers 8a, 8b and 8c having different thicknesses are inserted between the bracket 9 and the spindle motor support portions 2a, 2b and 2c, it is ideal that the spacers 8a, 8b and 8c each have a wedge shape with a taper. This is because the selection of the thicknesses of the spacers 8a, 8b and 8c is based on the calculation results at the center positions of the spindle motor support portions 2a, 2b and 2c as described above.

However, it is difficult that the spacers 8a, 8b and 8c are formed to have a desired taper. Even if they are formed into such a shape, it is difficult to have sufficient effects. This is because the distances among the positions of the spindle motor support portions 2a, 2b and 2c on the chassis 1 are far larger than the diameters of the spacers 8a, 8b and 8c. For this reason, even if the spacers 8a, 8b and 8c having a cylindrical shape with parallel faces on both ends are inserted between the bracket 9 and the spindle motor support portions 2a, 2b and 2c to carry out height correction, the error of the correction is very small and does not cause any problematic tilt.

Embodiment 4

Figure 10:
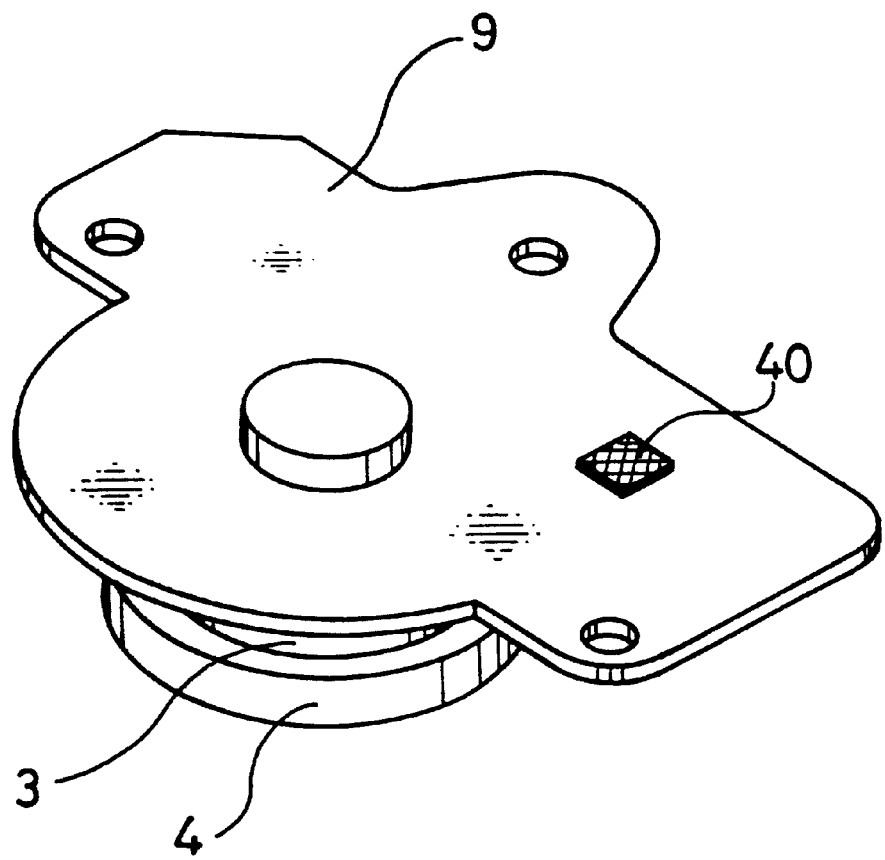
FIG. 10 is a perspective view showing the spindle motor of an optical disk apparatus in accordance with embodiment 4 of the present invention.

An optical disk apparatus in accordance with embodiment 4 of the present invention will be described below referring to the accompanying drawings. FIG. 10 is a perspective view showing the optical disk apparatus in accordance with the embodiment 4.

The basic configuration of the optical disk apparatus in accordance with the embodiment 4 is the same as that of the aforementioned embodiment 1. Therefore, the same components in structures and functions as those of the optical disk apparatus in accordance with the aforementioned embodiment 1 are designated by the same numerals, and their explanations are omitted.

The tilt and the height of the disk mounting face 4a of the turntable 4 with respect to the bracket 9 of the single unit of a spindle motor 3 have been measured beforehand in the assembly process of the optical disk apparatus in accordance with the embodiment 4. The measurement data of the single unit of the spindle motor 3 is converted into two-dimensional data codes and recorded on a sheet 40. The sheet 40 on which the measurement data is recorded is bonded to the bracket 9 of the spindle motor 3. Therefore, in the embodiment 4, in the process wherein the spindle motor 3 is installed on the chassis 1, the data of the spindle motor 3 required for the assembly process can be obtained easily by reading the two-dimensional data codes on the sheet 40 when calculating the tilt of the disk mounting face 4a just as in the cases of the above-mentioned embodiments 1, 2 and 3.

As a result, the data required for the spindle motor assembly in the optical disk apparatus in accordance with the embodiment 4 can be obtained on the assembly line. Therefore, it is possible to shorten the time until the result of the calculation regarding the tilt of the disk mounting face 4a is obtained, thereby capable of improving productivity.

An example wherein the measurement data is converted into two-dimensional data codes and written on the sheet 40 is taken in the above-mentioned embodiment 4. However, the present invention is not limited to this example. Even a generally used data sheet, for example, a bar code, may be used without causing any problems, provided that desired data is written on it.

The present invention has the following effects as clearly disclosed by the detailed explanations of the embodiments.

In the optical disk apparatus in accordance with the present invention, measurement and calculation are carried out to obtain the tilt of the turntable on which a disk is mounted and rotated and the tilt of a plane formed by the spindle motor support portions on the chassis on which the spindle motor having the turntable is installed. Then, the spacers formed on the basis of the calculation results and used as correction means are inserted between the spindle motor support portions and the bracket or the support portions are ground so that the disk mounting face of the optical disk apparatus becomes a desired face. In the optical disk apparatus configured as described above, the tilt and the distance between the disk mounted on the turntable and the reading means become proper. Therefore, the information of the disk can be read securely.

In the method of installing the spindle motor of the optical disk apparatus in accordance with the present invention, data required for the correction of the tilt of the spindle motor support portions is calculated on the basis of the tilt and height of the turntable with respect to the bracket of the spindle motor bracket at the bracket of the spindle motor and the spindle motor support portions. Furthermore, by inserting the spacers having desired thicknesses or by grinding the spindle motor support portions so that they have desired heights on the basis of the calculation results of the tilt correction, the positional relationship between the reading means and the recording medium mounted on the turntable can be maintained in a desired condition at all times in the method of installing the spindle motor of the optical disk apparatus in accordance with the present invention. The desired condition can be maintained even if the tilt and height of the turntable of the single unit of the spindle motor have variations and even if the heights of the spindle motor support portions and the optical pickup support portion on the chassis have variations.

Furthermore, in the method of installing the spindle motor of the optical disk apparatus in accordance with the present invention, the measurement data regarding the tilt and height of the reading means is used to calculate tilt correction. As a result, variations at the reading means can be corrected. It is thus possible to obtain an effect of greatly improving productivity.

Moreover, in the method of installing the spindle motor of the optical disk apparatus in accordance with the present invention, the tilt and height of the turntable with respect to the bracket of the spindle motor itself are formed into data and written on the spindle motor. Therefore, the information on the single unit of the spindle motor can be easily obtained at its production assembly line. It is thus possible to obtain an effect of greatly improving productivity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An optical disk apparatus comprising:

reading means for reading information from a disk on which information is recorded, movement means for moving said reading means in parallel with the recording face of said disk, a spindle motor having a turntable on which said disk is mounted and rotated and having a bracket secured thereto, a chassis having plural spindle motor support portions to support said bracket, on which said movement means is fixed and said reading means is movably held, and height correction means for calculating a height, whereat said spindle motor is supported by said spindle motor support portions on the basis of the tilt and height data of the disk mounting face of said turntable with respect to a reference plane and on the basis of the tilt and height data of a plane formed by said plural spindle motor support portions on said chassis with respect to the reference plane and for correcting the heights of said spindle motor support portions on the basis of the result of the calculation.

2. An optical disk apparatus in accordance with claim 1, wherein said movement means is supported by movement means support portions provided on said chassis, said height correction means calculates the height of a plane formed by said movement means support portions with respect to the reference plane, and the heights of said spindle motor support portions are corrected on the basis of the result of the calculation.

3. An optical disk apparatus in accordance with claim 1, wherein said height correction means carries out correction by installing spacers having desired thicknesses on said spindle motor support portions when the heights of said spindle motor support portions obtained as the result of the calculation have minus values, and on the other hand, when the heights of said spindle motor support portions obtained as the result of the calculation have plus values, said height correction means carries out correction by grinding said spindle motor support portions so that they have desired heights.

4. An optical disk apparatus in accordance with claim 3, wherein said spacers for said height correction means are formed of plural sheet-like substances having different thicknesses, and spacers selected on the basis of the result of the calculation are inserted between said spindle motor support portions and said bracket.

5. An optical disk apparatus in accordance with claim 3, wherein said spindle motor support portions, at least three in number, are formed on said chassis.

6. An optical disk apparatus in accordance with claim 1, wherein data regarding the tilt and height of said disk mounting face with respect to said bracket of said spindle motor is written on a part of said spindle motor.

7. An optical disk apparatus in accordance with claim 6, wherein said data is described on a sheet-like sticker and said sticker is bonded to a spindle motor corresponding to said data.

8. A method of installing the spindle motor of an optical disk apparatus, in an assembling process for the optical disk apparatus having
    reading means for reading information from a disk on which information is recorded,
    movement means for moving said reading means in parallel with the recording face of said disk,
    a spindle motor having a turntable on which said disk is mounted and rotated and having a bracket secured thereto, and
    a chassis having plural spindle motor support portions to support said bracket, on which said movement means is fixed and said reading means is movably held, comprises:
        a step of measuring and calculating the tilt and height of the disk mounting face of said turntable with respect to a reference plane, and
        a step of carrying out calculation for height correction in accordance with the results of measurement and calculation on the basis of data regarding said turntable and correcting the heights of said spindle motor support portions on the basis of the result of the calculation.

9. A method of installing the spindle motor of an optical disk apparatus in accordance with claim 8, wherein said correction step carries out correction by installing spacers having desired thicknesses on said spindle motor support portions when the heights of said spindle motor support portions obtained as the result of the calculation have minus values, and on the other hand, when the heights of said spindle motor support portions obtained as the result of the calculation have plus values, said height correction means carries out correction by grinding said spindle motor support portions so that they have desired heights.

10. A method of installing the spindle motor of an optical disk apparatus in accordance with claim 8, wherein data regarding the tilt and height of said disk mounting face with respect to said bracket of said spindle motor is written on a sheet-like sticker bonded to a part of said spindle motor.

11. A method of installing the spindle motor of an optical disk apparatus, in an assembling process for the optical disk apparatus having
    reading means for reading information from a disk on which information is recorded,
    movement means for moving said reading means in parallel with the recording face of said disk,
    a spindle motor having a turntable on which said disk is mounted and rotated and having a bracket secured thereto, and
    a chassis having plural spindle motor support portions to support said bracket, on which said movement means is fixed and said reading means is movably held, comprises:
        a step of measuring and calculating the tilt and height of the disk mounting face of said turntable with respect to a reference plane,
        a step of measuring and calculating the tilt and height of a plane formed by said plural spindle motor support portions on said chassis with respect to a reference plane, and
        a step of carrying out calculation for height correction in accordance with the results of measurement and calculation on the basis of data regarding said turntable and said chassis and correcting the heights of said spindle motor support portions in accordance with the result of the calculation.

12. A method of installing the spindle motor of an optical disk apparatus, in an assembling process for the optical disk apparatus having
    reading means for reading information from a disk on which information is recorded,
    movement means for moving said reading means in parallel with the recording face of said disk,
    a spindle motor having a turntable on which said disk is mounted and rotated and having a bracket secured thereto, and
    plural spindle motor support portions to support said bracket, on which said movement means is fixed and said reading means is movably held, and plural movement means support portions for supporting said movement means, comprises:
        a step of measuring and calculating the tilt and height of the disk mounting face of said turntable with respect to a reference plane,
        a step of measuring and calculating the tilt and height of a plane formed by said plural spindle motor support portions on said chassis with respect to a reference plane,
        a step of measuring and calculating the tilt and height of a plane formed by said plural movement means support portions on said chassis with respect to the reference plane, and
        a step of carrying out calculation for height correction in accordance with the results of measurement and calculation on the basis of data regarding said turntable and said chassis and correcting the heights of said spindle motor support portions in accordance with the result of the calculation.

* * * * *